Aug. 11, 1936.   R. C. JONES   2,050,572
MEANS FOR SERVICING COVERED VEHICLE SPRINGS
Filed May 11, 1934
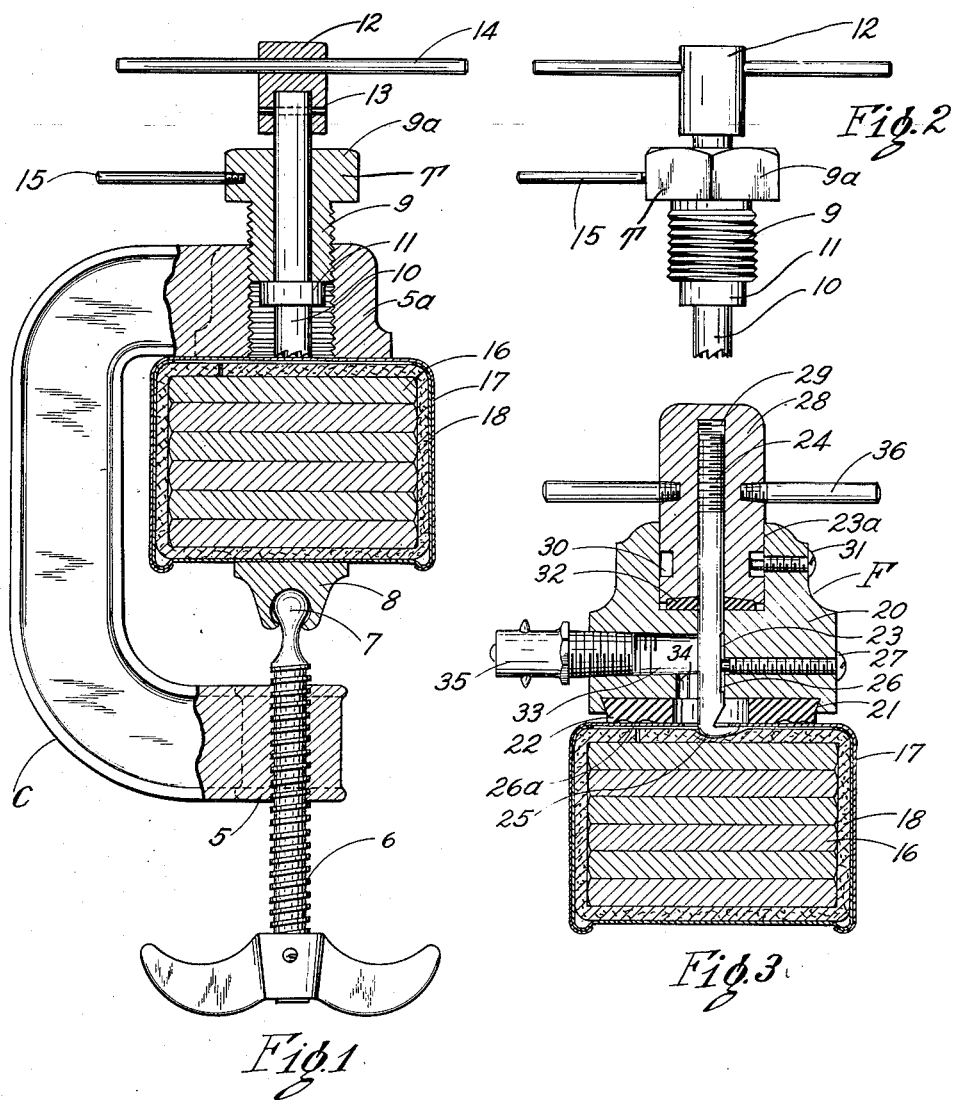
Inventor
RAY C. JONES
By Richey & Watts
Attorneys Patented Aug. 11, 1936

2,050,572

UNITED STATES PATENT OFFICE 2,050,572

MEANS FOR SERVICING COVERED VEHICLE SPRINGS

Ray C. Jones, Tiffin, Ohio

Application May 11, 1934, Serial No. 725,174

4 Claims. (Cl. 184—1)

This invention relates to means for servicing or lubricating vehicle springs of the type equipped with covers, generally of metal and lacking suitable lubricating or grease fittings when originally applied to the spring.

As far as I know, the method most commonly followed heretofore in servicing covered vehicle springs of the leaf type has been to drill the spring from below, or in the bottom wall thereof, and then insert a lubricant fitting adjacent the drilled hole, endeavor to provide clearance between the bottom wall of the cover and the spring for the passage of the lubricant, and apply lubricant under pressure to the spring. It has been recognized that this method was more or less impractical from the standpoint of effective and permanent lubrication, since the grease or lubricant seldom penetrated to all parts of the cover, the bulk of the lubricant staying at the bottom of the spring and never reaching the points needing lubrication. Furthermore, unless the hole is covered, the lubricant drains therefrom; and it is extremely difficult, if not impractical, to cover the drilled hole or to attach a permanent fitting thereto. If the lubricant is applied at the top of the spring cover, it works its way by gravity and through constant flexing of the spring to all parts of the latter. Heretofore, however, it has been considered extremely difficult if not impossible with known tools to drill the hard metal cover from the top, and as a consequence, the foregoing or similarly ineffective methods have been tolerated or else the owner of the vehicle accepts the situation and either discards the cover or permits the spring to go unlubricated.

The primary object of the invention, therefore, is to provide improved means for efficiently lubricating vehicle springs having covers thereon.

Another and more specific object of the invention is to provide improved means whereby a wall, and particularly the top wall of a vehicle spring cover may be readily and conveniently drilled to receive a fitting for the application of lubricant.

Another object is to provide an improved fitting for applying lubricant to a covered vehicle spring which will effect a tight seal capable of withstanding the pressure to which it is normally subjected when the lubricant is forced into the cover; and which also provides clearance between the cover and spring for facilitating application of the lubricant.

The foregoing and other objects and important advantages will become apparent in view of the following description taken in conjunction with the drawing, wherein:

Figure 1 is a view in sectional elevation of a spring and cover therefor, together with the improved tool for drilling the cover shown in drilling position;

Figure 2 is a detail view in elevation of the drilling tool removed from its holder or clamp; and Figure 3 is a central vertical sectional view taken through a spring cover and my improved fitting.

The assembly in general comprises a holder frame or clamp member, generally indicated at C, a drilling tool, generally indicated at T, and a fitting, generally indicated at F.

The frame or clamp member C is preferably in the form of a C-clamp provided at its lower nose portion 5 with a clamping screw 6 having a ball head 7, and a contact or bearing member 8 mounted for universal movement on said head and adapted to bear against the bottom wall of the spring cover.

The tool T preferably comprises an externally threaded sleeve 9, which is adapted to be threaded into the upper nose portion 5a of the C-clamp or bracket C, a relatively short drilling bit 10 which is provided at its lower extremity with a retaining and bearing collar 11 and at its upper extremity with a cap or head 12, which is secured to said shank by means of a stud or pin 13, and a handle 14 which is extended through the cap 12 to facilitate rotation of the bit 10. A further handle 15 is fixed to the head 9a of the sleeve 9 to facilitate manipulation of the latter.

A vehicle spring of the leaf type is generally indicated at 16 and has applied thereover a cover 17, suitable packing material 18 in the form of felt or the like being interposed between the cover and spring, as is usually practiced in modern spring construction.

The operation of the improved tool is as follows:

The tool T having been inserted in the upper nose 5a of the clamp C, the clamp is applied over the spring cover and the screw 6 tightened to bring the bearing member 8 against the lower wall of the cover 17 and the nose portion 5a against the upper wall of the cover, the bit 10 being spotted relatively to the upper wall of the cover at the point it is desired to drill the hole for the fitting, and the handle 15 being used to lower the sleeve 9 and bit 10 in contact with the cover and maintain the desired drilling pressure on the bit. The drill may be readily rotated by gripping the handle 14.

An important advantage in this type of tool is that the cover may be readily drilled from the top thereof, or the top wall of the cover may be drilled to receive the fitting. Heretofore this has been a very difficult undertaking, and in fact so difficult as to be considered almost impossible while the spring is in position in the chassis of the vehicle. Furthermore, the upper wall of the spring is the proper place to drill the fitting holes, since any lubricant applied at this point will flow by gravity through the various parts of the spring which need lubrication, and thereafter the fitting hole may remain uncovered without loss of the lubricant. It will be obvious, however, that the improved tool may be used to drill any desired wall of the cover.

The improved fitting F is clearly shown in Figure 3 and comprises a body portion or housing 20, which is formed with an under-cut recess in the bottom wall thereof, as at 21, in which a sealing gasket 22 is seated, the latter preferably being formed with one or more annular concentric bosses 26a to ensure an effective seal when pressure is applied on the gasket.

The central portion of the housing is drilled vertically or formed with a vertical bore 23 which is enlarged at its upper extremity as at 23a. A clamping assembly is inserted in the bores 23 and 23a and as shown comprises a clamping pin 24 which terminates at its lower end in a gripping hook 25. The lower shank portion of the pin 24 is formed with a longitudinal keyway 26, and a key in the form of a screw 27 is threaded into the housing with the inner end thereof engaging in said keyway, to hold the pin against rotation during the attaching operation. The pin 24 is threaded at its upper extremity and is adapted to be inserted in a head 28 formed with a longitudinal bore 29, which is interiorly screw threaded to receive the upper extremity of the pin 24. The lower extremity of the head 28 is formed with an annular groove 30 in which the inner end of a retaining key in the form of a stud or screw 31 engages, the said screw being threaded into housing 20. A bushing or bearing member 32 is preferably interposed between the lower surface of the head 28 and the adjacent surface of the housing 20.

The housing 20 is formed with a transverse lubricating bore or passageway 33 which feeds into a vertical passageway 34, the latter feeding into the central open portion of the gasket 21 and thence into the opening formed in the top wall of the spring cover. The passage 33 is interiorly threaded and has inserted therein a suitable nipple or fitting 35 for application of the tube or grease gun or like means for applying lubricant under pressure. The head 28 is provided with a handle or like means 36 to facilitate rotation thereof.

The fitting F may be assembled in any suitable manner, such as by first assembling the pin 24 in the head 28, and then inserting the head and pin into the housing 20 and advancing the screws 27 and 31 until they register with the keyway 23 and groove 30, respectively. It will be seen that when the head 28 is rotated, the pin 24 will either be lowered or raised, depending upon the direction of rotation of said head, the said pin being held against rotation by the key 27 engaging in the longitudinal spline way or groove 23.

The manner in which the improved fitting may be applied to a spring will be readily apparent from the sectional view in Figure 3, the clamping hook 25 being inserted in the hole drilled in the upper wall of the cover and then moved over and engaged under said wall, whereupon the head 28 is rotated and the fitting tightened down against said spring. Suitable lubricant may then be applied and thereafter the fitting removed.

It will be noted that the hook 25 has a tapered or wedge-shaped end which when inserted between the top leaf and cover, separates the cover from the spring and provides clearance for the admission of lubricant.

Since the hole through which the lubricant is passed is drilled in the top wall of the spring, the lubricant will not have a tendency to leak from the cover. I have found by actual experience that a spring may be readily and effectively drilled and a lubricant applied in a relatively short time. While I prefer to remove the fitting, yet it will be obvious that the fitting may remain in position permanently and lubricant applied at any desired time. Obviously, if desired, the holes drilled in the top of the cover may be covered to keep out foreign matter in event the fitting is removed.

It will be understood that certain minor changes and variations in structure may be adopted within the scope of the invention as defined by the appended claims.

I claim:

1. A fitting for facilitating the application of a lubricant to vehicle springs provided with covers comprising a housing, a gasket adapted to seat in the lower end of the housing, said housing being formed with an axial bore, a clamping member mounted in said bore and having a part adapted to engage a wall of the cover, means for preventing rotation of said clamping member, and a tightening member screwed onto said clamping member and rotatable about the latter to move the said member axially and clamp the said part against the wall of the cover, said housing being provided with a passageway for directing the lubricant into the cover.

2. A fitting particularly adapted for facilitating the application of a lubricant to vehicle springs provided with covers comprising a housing having a gasket seated in the lower end thereof, said housing being formed with an axial bore, a clamping pin mounted for limited axial movement in said bore and having a part at its lower end adapted to engage the wall of the cover, means for holding the said pin against rotation with respect to the housing, and a clamping head mounted in said housing and having threaded engagement with said pin, said head being rotatable about said pin to move said part into and from clamping engagement with said wall, the housing being provided with a passageway for directing lubricant into the cover.

3. A fitting particularly adapted for vehicle springs provided with covers having a hole drilled in one of the walls thereof comprising a housing having a gasket seated in the lower surface thereof adapted to fit over said wall, said housing being formed with an axial bore, a clamping pin mounted for limited axial movement in said bore and having a clamping hook at the lower end thereof adapted to be inserted in said hole and moved into contact with said wall, a clamping head rotatably mounted in said housing and having threaded engagement with said pin, said clamping head being rotatable about said pin to move said hook into and from clamping engagement with respect to said wall, said housing being provided with a passageway for directing lubricant into the cover.

4. A fitting particularly adapted for vehicle springs provided with covers having a hole drilled in one of the walls thereof comprising a housing having a gasket seated in the lower end thereof, said housing being formed with an axial bore terminating in an enlarged opening, a clamping pin mounted in said bore and having a clamping hook at its lower end adapted to be inserted in said hole and under the adjacent wall, said pin being formed with a spline groove, a spline member inserted in said housing and having its end engaging said groove to prevent rotation of said pin, a clamping head seated in said enlarged opening and having threaded engagement with said pin, said clamping head being formed with an annular groove and said housing being provided with a member engaging in said groove to hold the head against axial displacement, said head being rotatable about the pin to move said hook into and from clamping engagement with respect to said wall, the housing being formed with a passageway for directing lubricant into the cover, and a nipple threaded into said passageway.

RAY C. JONES.